United States Patent
Zhang et al.

(10) Patent No.: US 7,679,379 B2
(45) Date of Patent: Mar. 16, 2010

(54) DETECTING APPARATUS AND DETECTING BOARD THEREOF

(75) Inventors: Bing-Jun Zhang, Shenzhen (CN); Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 107 days.

(21) Appl. No.: 11/834,700

(22) Filed: Aug. 7, 2007

(65) Prior Publication Data

US 2008/0164889 A1     Jul. 10, 2008

(30) Foreign Application Priority Data

Jan. 8, 2007    (CN)   ..................... 2007 1 0200022

(51) Int. Cl.
     *G01R 27/08*     (2006.01)
(52) U.S. Cl. .................. 324/693; 324/699; 324/701
(58) Field of Classification Search ........... 324/693, 324/699, 701
See application file for complete search history.

(56) References Cited

U.S. PATENT DOCUMENTS 3,958,338 A * 5/1976 Anichini et al. ............... 33/542
4,344,233 A * 8/1982 Albertazzi ............... 33/501.06
4,348,814 A * 9/1982 Possati et al. ............ 33/501.09
4,412,385 A * 11/1983 Selleri ........................ 33/542
6,801,045 B2 * 10/2004 Hamm et al. .............. 324/713

FOREIGN PATENT DOCUMENTS

| CN | 2677944 Y | 2/2005 |
| JP | 6226340 A | 11/1987 |
| JP | 8285512 A | 11/1996 |

\* cited by examiner

*Primary Examiner*—Timothy J Dole
*Assistant Examiner*—Farhana Hoque
(74) *Attorney, Agent, or Firm*—Zhigang Ma

(57) ABSTRACT

A detecting apparatus for checking shape, size and/or position of a hole of a workpiece, includes a platform for supporting the workpiece, a detecting board, which includes a detecting unit, movably set above the platform, an electrical source, a processor, and an indicator. The source, the unit, and the workpiece make up a circuit connected to the processor. When the board is moved to the workpiece, and the unit enters the hole without touching the workpiece the circuit will remain open, and the processor will control the indicator to indicate that the hole is eligible. If the detecting unit touches the workpiece, the circuit closes, and the processor will control the indicator to indicate that the hole is ineligible. An end of the unit that enters the hole is radially deformable. The apparatus improves detecting efficiency and accuracy, and is suitable for use in mass production.

12 Claims, 9 Drawing Sheets

DETECTING APPARATUS AND DETECTING BOARD THEREOF

BACKGROUND

1. Field of the Invention

The present invention relates to detecting apparatuses and detecting board thereof, and particularly to a detecting apparatus and a detecting board thereof for checking shapes, sizes, and/or positions of holes in a workpiece.

2. Description of Related Art

On an assembly line, some holes made in a workpiece may need to be checked for linearity and positioning.

Typically, the checking procedure is done manually by workmen using simple tools. However, when an allowable tolerance is very small such as 0.5 millimeter, accurate detection of misalignment and/or non-linearity of holes by workmen with simple tools may not be sufficient to the task, especially in mass production.

What is desired, therefore, is a detecting apparatus, which improves the detecting efficiency and accuracy of hole alignment, suitable for use in mass production.

SUMMARY

An exemplary detecting apparatus for checking the shape, size, and position of a hole of an electrically conductive workpiece, includes a platform configured to support the workpiece thereon, a dielectric detecting board movably set above the platform, an electrically conductive detecting unit supported on the detecting board in alignment with a desired hole placement of the workpiece, an electrical source configured for forming a circuit with the detecting unit and the workpiece, a processor electrically connecting with the circuit, and an indicator electrically connecting with the processor. When the detecting board is moved to the workpiece, if the detecting unit enters the hole without touching with a wall of the workpiece bounding the hole, the circuit remains open, the processor receives a circuit open signal and controls the indicator to indicate that the hole is eligible; if the detecting unit contacts the wall bounding the hole, the circuit closes, and the processor receives a circuit closed signal and controls the indicator to indicate that the hole is ineligible.

Other advantages and novel features will become more apparent from the following detailed description when taken in conjunction with the accompanying drawings, in which:

DETAILED DESCRIPTION

Figure 1:
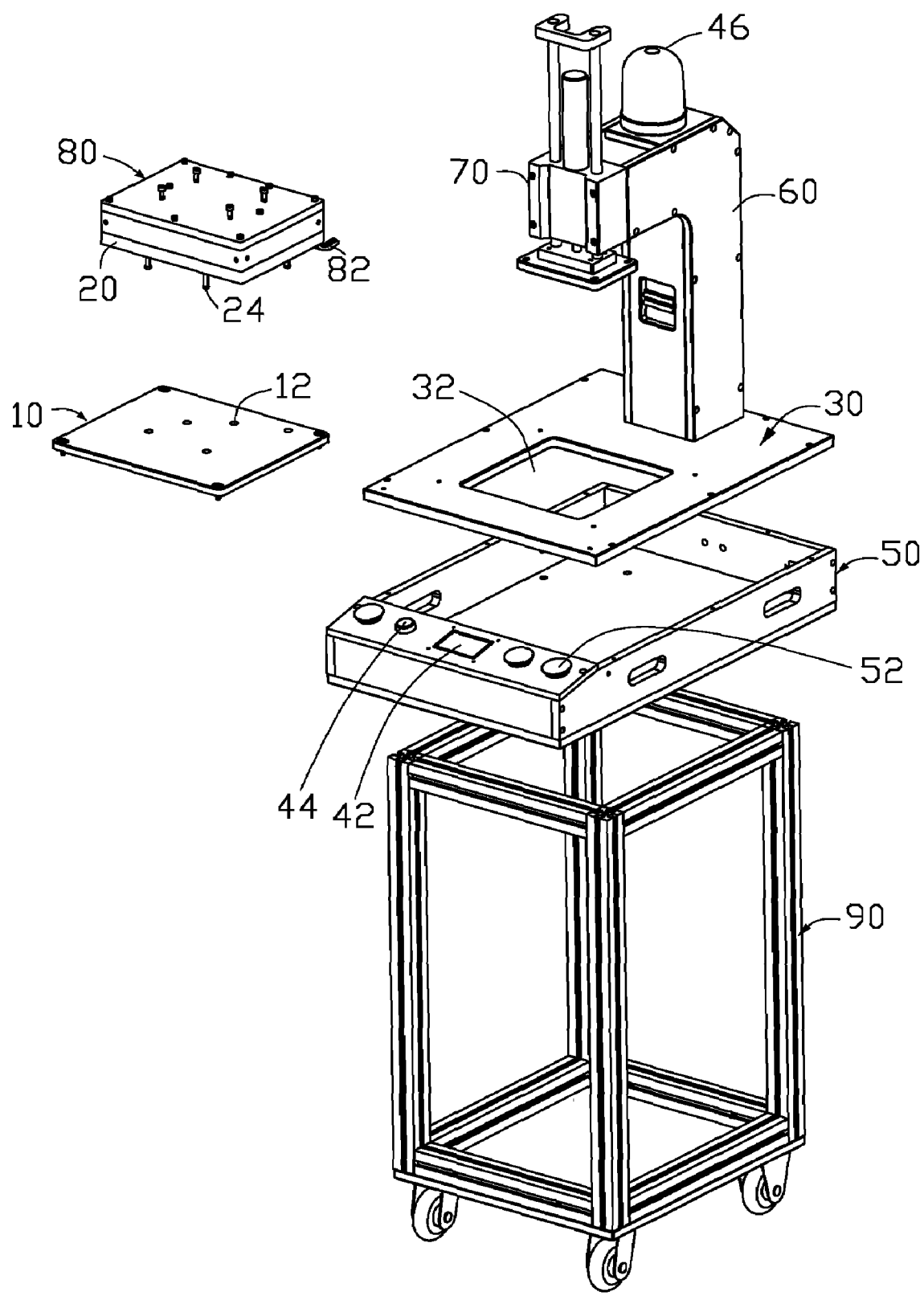
FIG. 1 is an exploded, isometric view of a detecting apparatus, together with a workpiece in accordance with an embodiment of the present invention, the detecting apparatus including a detecting board.
Figure 2:
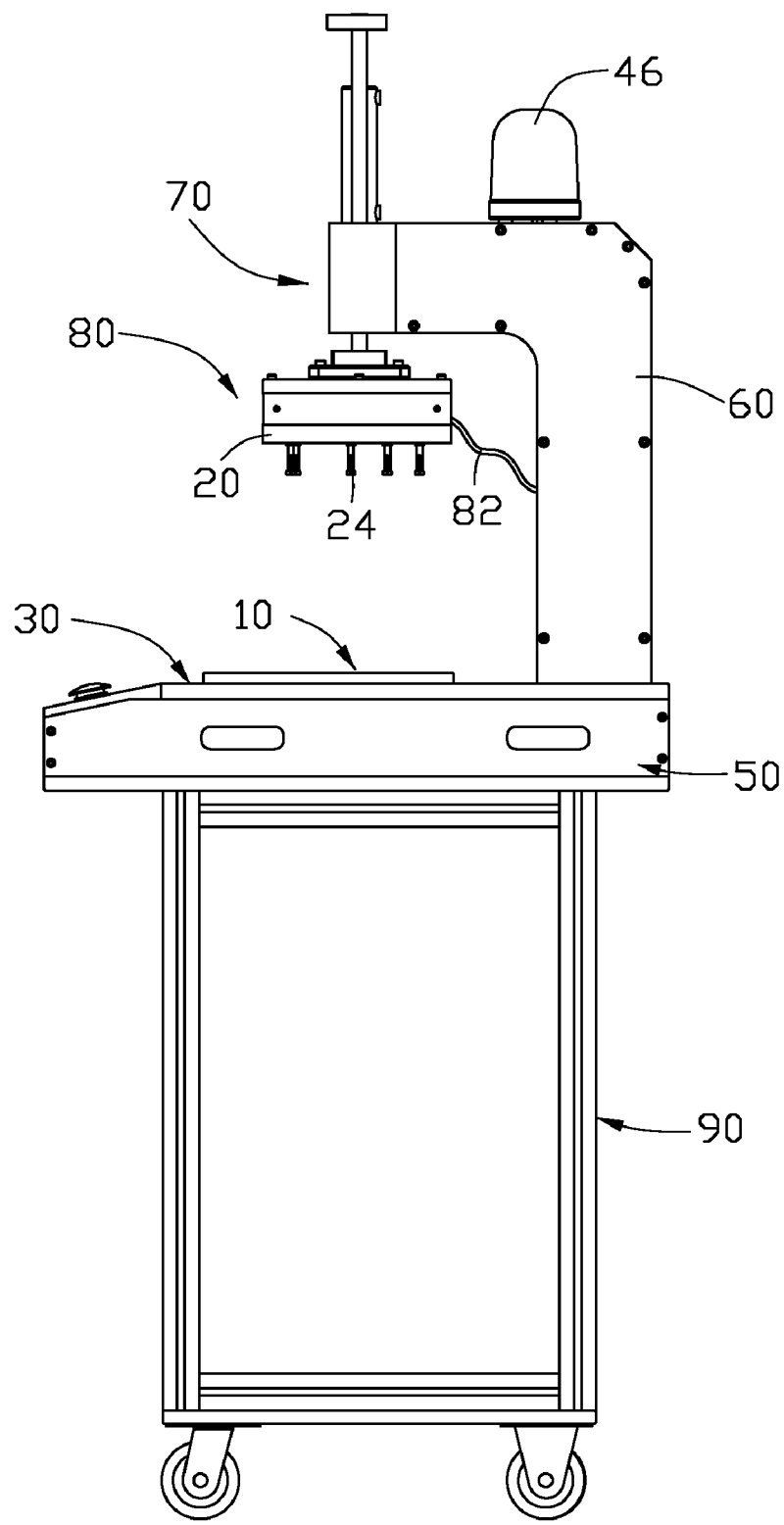
FIG. 2 is an assembled, right-side elevational view of FIG. 1.

Referring to FIGS. 1 and 2, a detecting apparatus in accordance with an embodiment of the present invention includes a platform 30 configured for supporting a workpiece 10, an electric control box 50 mounted under the platform 30, a table 90 supporting the box 50, an L-shaped brace 60 mounted at a back portion of the platform 30, a cylinder device 70 fixed to a free end of the brace 60, and a detecting member 80 mounted to a lower end of the cylinder device 70 and suspended over the platform 30. The workpiece 10 consists of electrically conductive material. A plurality of holes 12 is defined in the workpiece 10.

The table 90 configured for supporting the electric control box 50 includes four wheels for moving the detecting apparatus.

A display 42, an indicator light 44, and a plurality of controller buttons 52 are set at a front of the electric control box 50. An electrical source (see FIG. 9) and a processor 55 (see FIG. 9) are set in the box 50. The electrical source is electrically connected with the workpiece 10.

A hole 32, over which the workpiece 10 is set, is defined in the platform 30.

A visible or audible alarm apparatus, such as an alarm annunciator 46, is set on a top of the brace 60. The annunciator 46, the display 42, and the indicator light 44 of the electric control box 50 alone, or in combination, make up an indicator of the embodiment.

Figure 3:
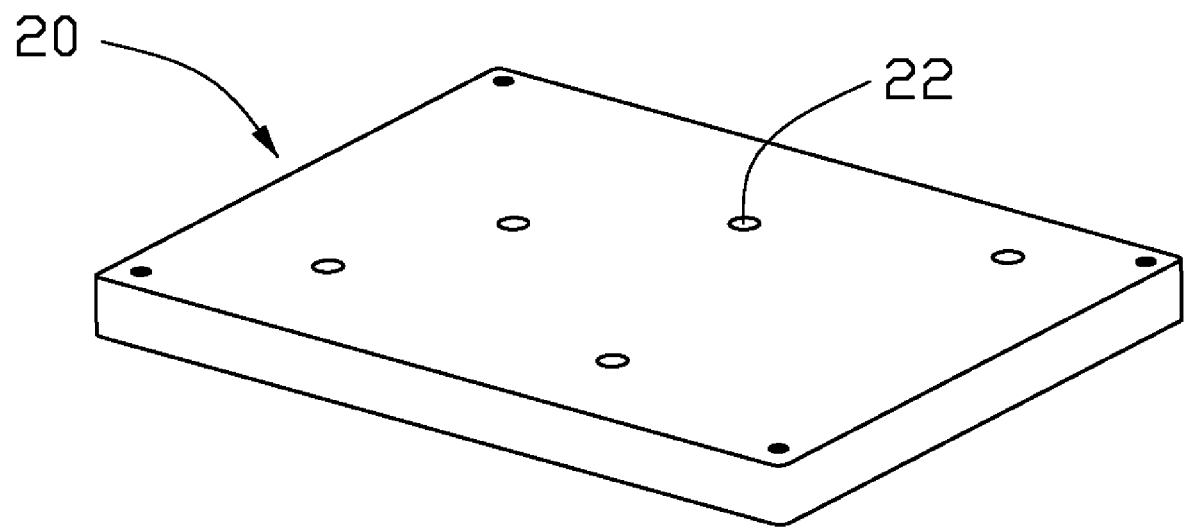
FIG. 3 is an exploded, isometric view of the detecting board of FIG. 1, the detecting board including a detecting unit.
Figure 3:
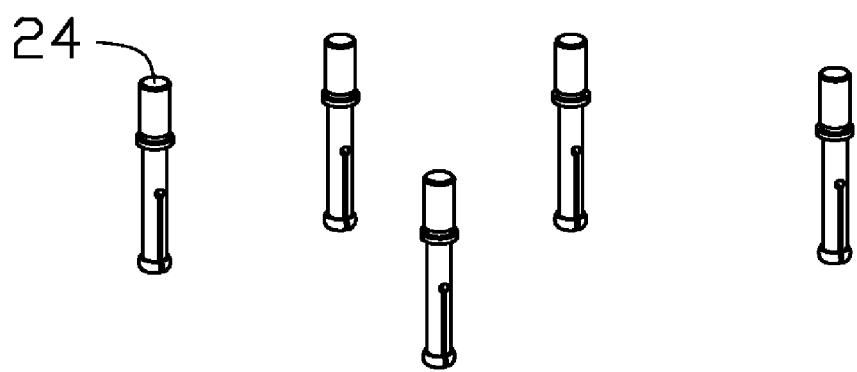
Figure 4:
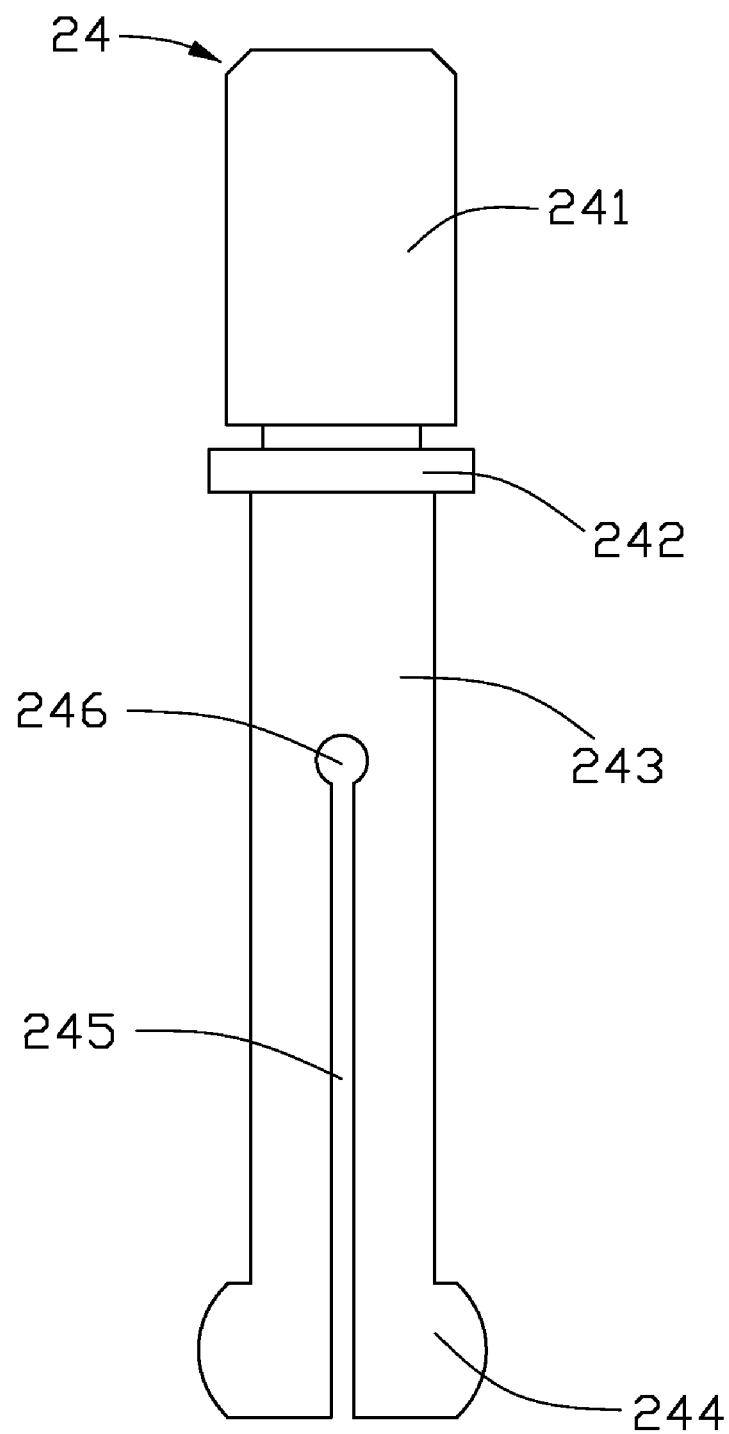
FIG. 4 is a side elevational view of the detecting unit of FIG. 3.
Figure 5:
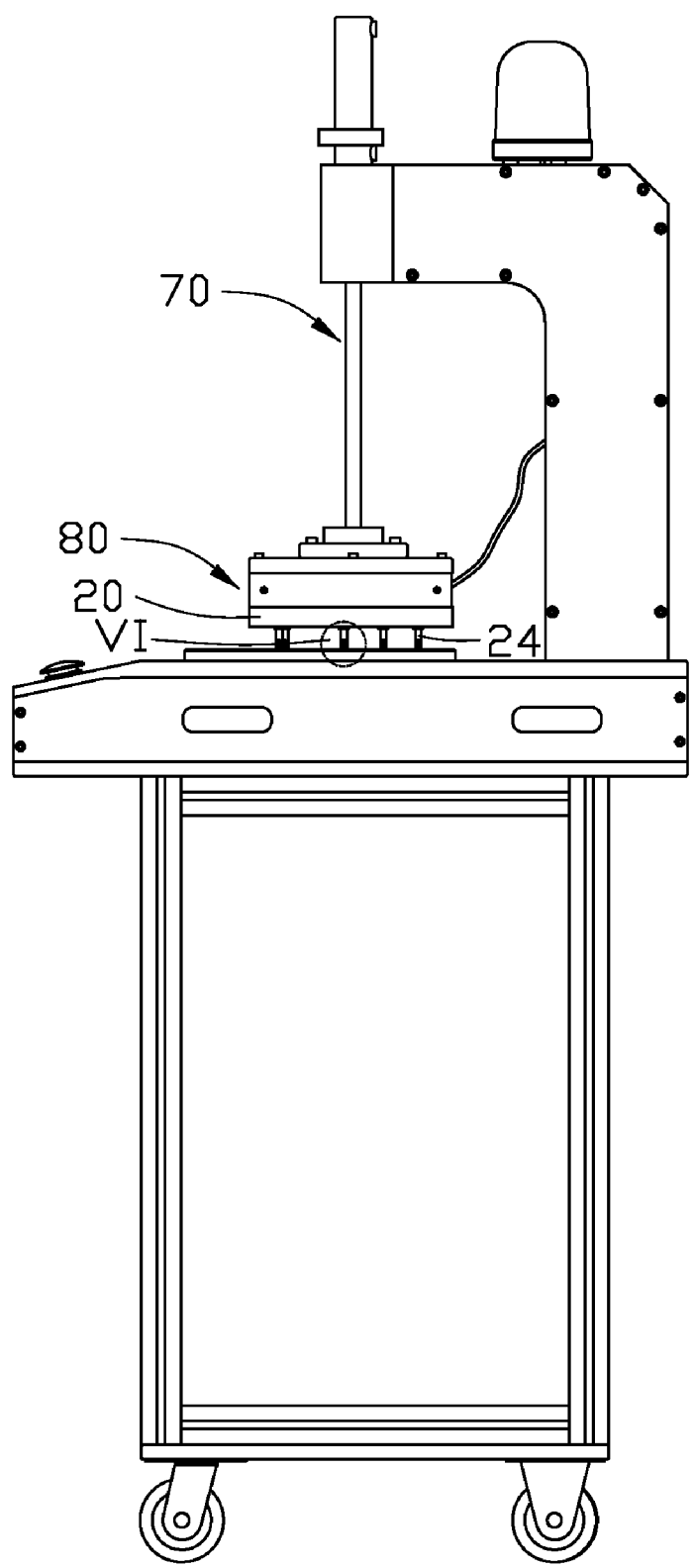
FIG. 5 is similar to FIG. 2, showing the detecting apparatus checking the workpiece.

Also referring to FIG. 3, the detecting member 80, which is driven by the cylinder device 70 to move in an up-and-down direction, includes a dielectric detecting board 20. A plurality of assembly holes 22 is defined in the detecting board 20. A plurality of detecting units 24 is respectively mounted in the assembly holes 22 by press fit technology. The detecting units 24 are set according to a predetermined pattern used to determine where the holes 12 of the workpiece 90 should be located. Referring to FIG. 4, the detecting unit 24 generally has a cylindrical shape. From the top down, the detecting unit 24 includes an assembly portion 241, a blocking portion 242, and a detecting portion 243. The assembly portion 241 is configured to interferentially insert into the corresponding assembly hole 22 of the detecting board 20. The blocking portion 242 is configured to abut against the detecting board 20 to keep the detecting unit 24 from passing all the way through the assembly hole 22. The detecting portion 243 includes a bulbous touching head 244 at its free end. A slot 245 is defined in the detecting portion 243 extending from the free end to a middle portion thereof to form two spaced apart sections, which makes the detecting portion 243 to be elastically deformable along a radial direction. A circular hole 246 is formed in communication with an end of the slot 245 in the middle portion of the detecting portion 243, for preventing stress concentrating at the end of the slot 245 when deforming the detecting portion 243 of the detecting unit 24. The detecting units 24 are electrically connected to the processor mounted in the electric control box 50 by a plurality of wires 82 (see FIG. 1). It should be understood that in other embodiments, another slot crossing the slot 245 and another circular hole perpendicular to the circular hole 246 may be defined in the detecting portion 243, which act as the slot 245 and the circular hole 246 to thereby form four spaced apart sections in the detecting portion 243, or even more slots and circular holes may be included as well.

Referring to FIGS. 5 to 8, in use, when the controller buttons 52 are pressed, the electric control box 50 is activated to control the cylinder device 70 to drive the detecting member 80 to move down until the detecting portion 243 of the detecting units 24 of the detecting board 20 insert into the corresponding holes 12 of the workpiece 10. Suppose a diameter of the hole 12 is equal to D, a value of the allowable tolerance of the accuracy of linearity/position of hole 12 is equal to δ, a maximum diameter of a cross section of the touching head 244 of the detecting unit 24 is equal to d, and d=D−2δ.

In what follows, one of the holes 12 is taken as an example for describing the working principle of the detecting apparatus in accordance with the embodiment.

Figure 6:
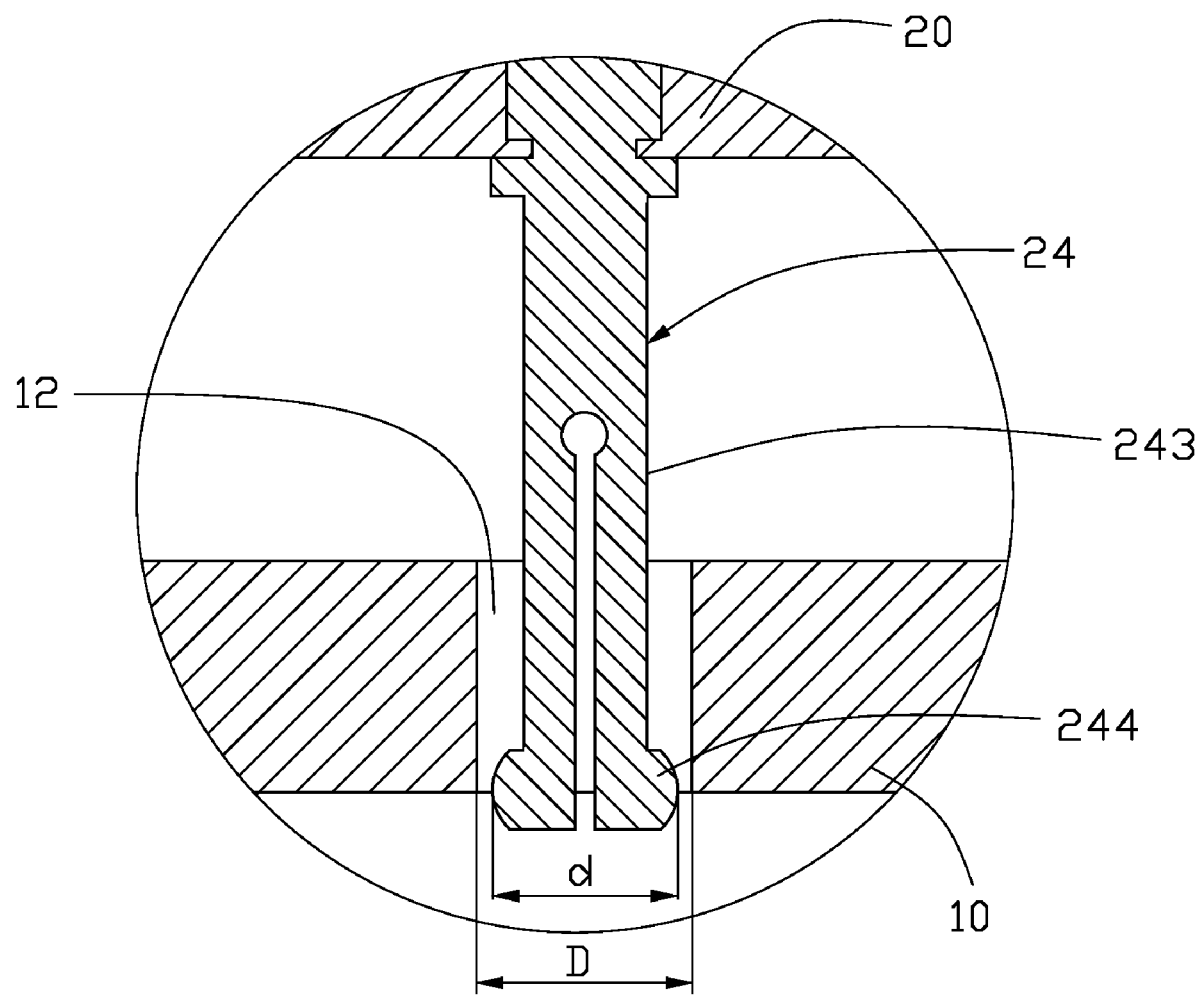
FIG. 6 is an enlarged, sectional view of a circled portion VI of FIG. 5, showing linearity and positioning of an eligible hole.

Referring to FIG. 6, the linearity and positioning of the hole 12 is eligible with zero-deviation. When the detecting member 80 moves down, the detecting portion 243 of the detecting units 24 inserts into the hole 12 of the workpiece 10, an axis of the detecting unit 24 aligns with an axis of the hole 12, a distance from any point of a circumference of the maximum cross section of the touching head 244 to a wall bounding the hole 12 is equal to δ, the detecting unit 24 does not touch the wall bounding the hole 12, and a circuit made up of the electrical source, the detecting unit 24, and the workpiece 10 can not form a closed circuit. The processor 55 receives a circuit open signal, and then controls the indicator to indicate that the hole 12 is eligible.

Figure 7:
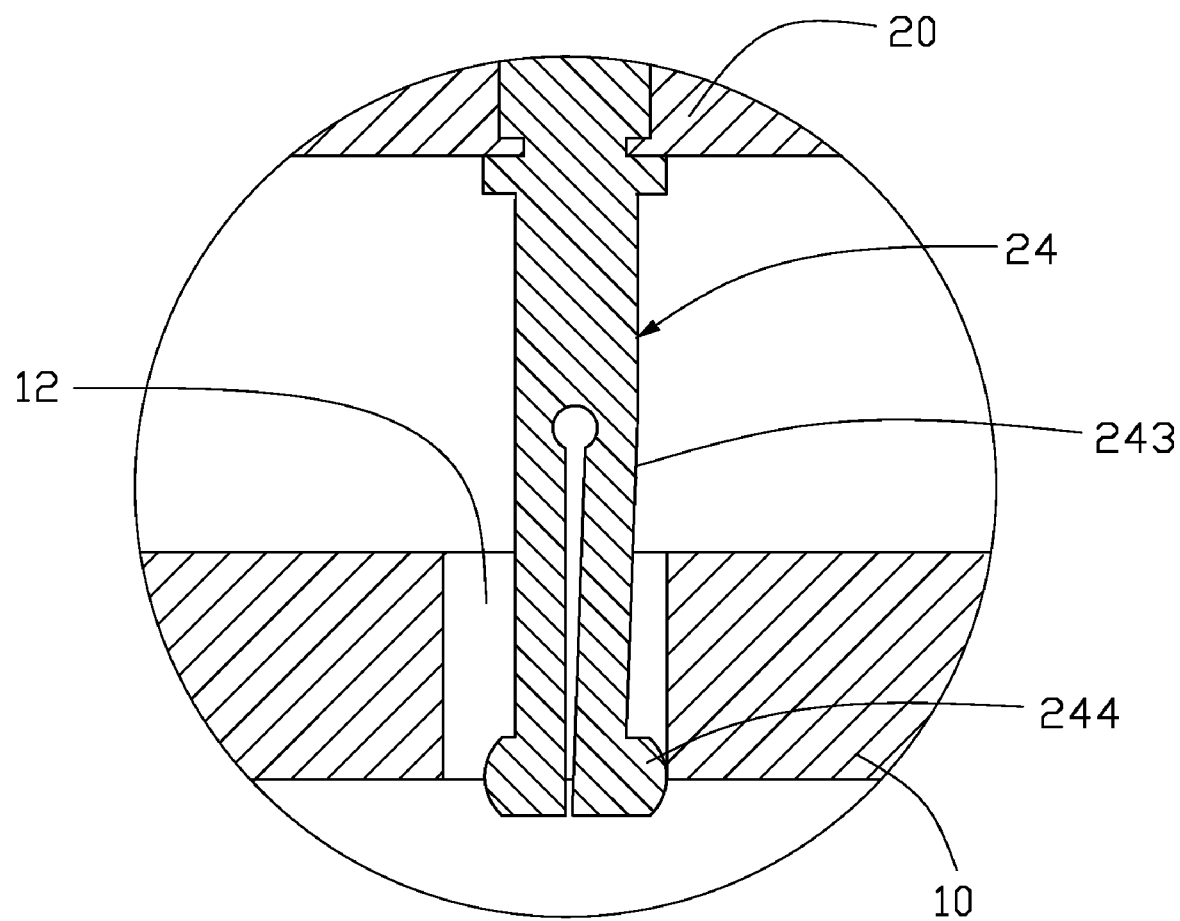
FIG. 7 is similar to FIG. 5, showing an ineligible hole with position out of tolerance.

Referring to FIG. 7, the hole 12 is not positioned within workpiece tolerance being out of position by more than δ, and so is found ineligible. When the detecting member 80 moves down, the detecting head 244 of the detecting unit 24 touches the wall bounding the hole 12 of the workpiece 10, the detecting head 244 is slid into the hole 12 along the wall while the wall urges the detecting head 244 in a radial direction to deform the detecting unit 24. Because of the engagement between the detecting head 244 and the wall, the circuit made up of the electrical source, the detecting unit 24, and the workpiece 10 closes. The processor 55 receives a circuit closed signal, and then controls the indicator to indicate that the hole 12 is ineligible.

Figure 8:
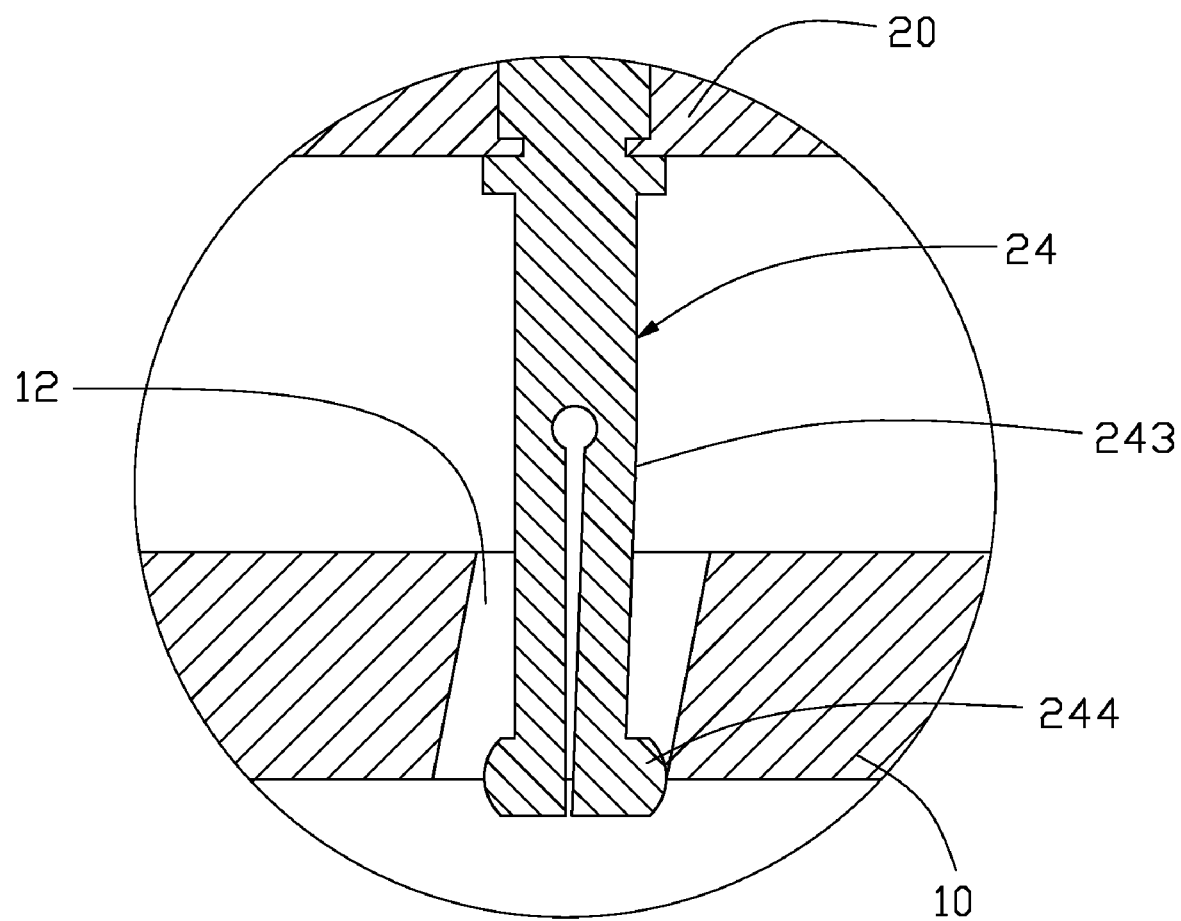
FIG. 8 is similar to FIG. 5, showing an ineligible hole with linearity out of tolerance.

Referring to FIG. 8, the hole 12 is ineligible, because a value x of a deflection of linearity of the hole 12 is more than δ. When the detecting member 80 moves down, the detecting head 244 of the detecting unit 24 contacts a wall bounding the hole 12, while the wall urges the detecting head 244 in a radial direction to deform the detecting unit 24. Because of the engagement between the detecting head 244 and the wall, the circuit made up of the electrical source, the detecting unit 24, and the workpiece 10 closes. The processor 55 receives a circuit closed signal, and then controls the indicator to indicate that the hole 12 is ineligible.

Figure 9:
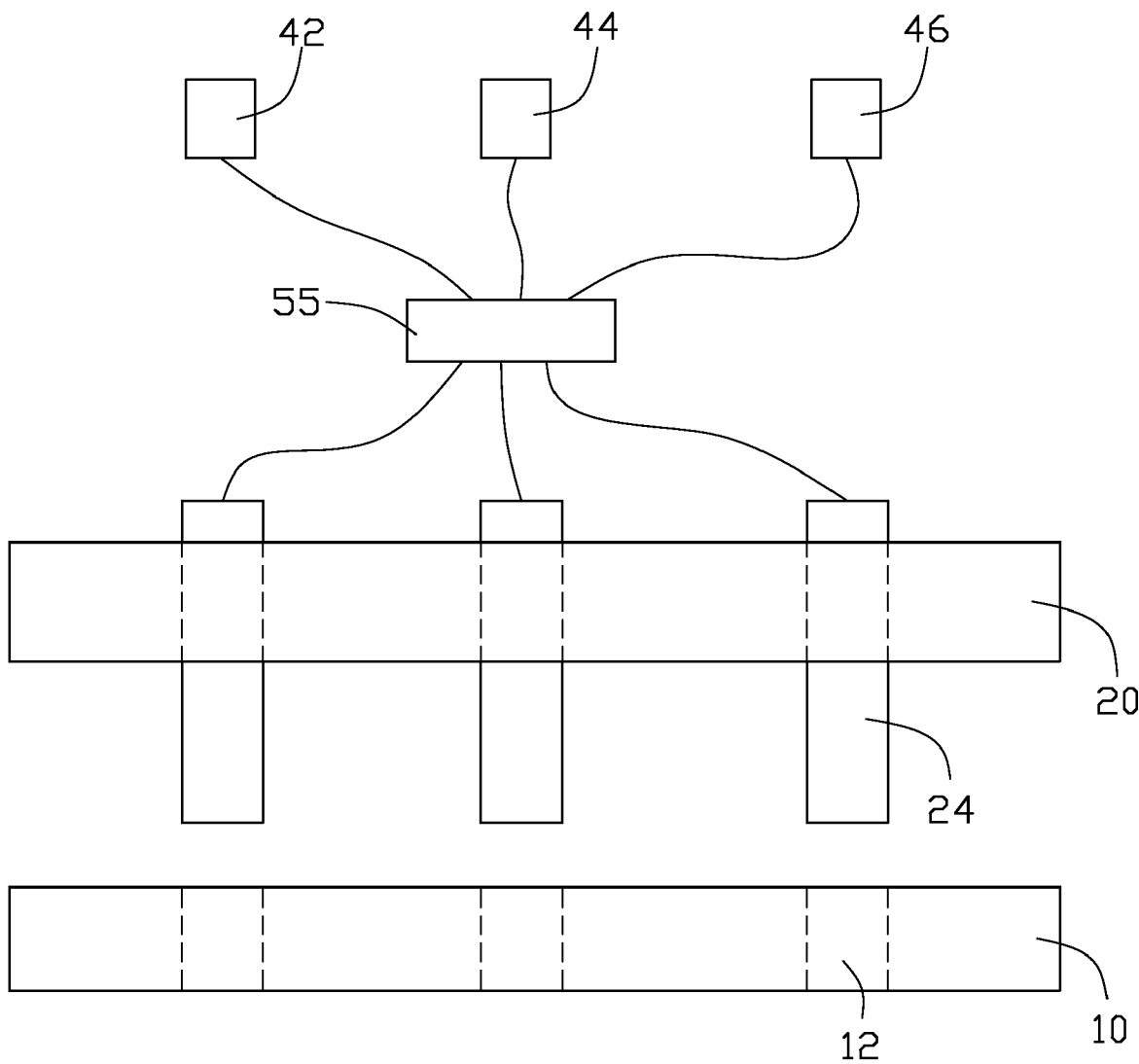
FIG. 9 shows an electrical relationship between the workpiece, detecting units, a processor, and an indicator in accordance with the embodiment of the present invention.

Referring to FIG. 9, if the indicator receives a result from the processor 55 that all the holes 12 of the workpiece 10 are eligible, the indicator light 44 shines and the display 42 indicates all the holes 12 have passed. If the indicator receives a result that some of the holes 12 are ineligible, the annunciator 46 is activated and the display 42 displays locations of the ineligible holes 12.

In other embodiments, the detecting head 244 of the detecting unit 24 may be formed with other desired shapes and/or sizes for checking other desired shapes, sizes and/or positions of other holes in workpieces.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A detecting apparatus for checking shape, size and/or position of a hole of an electrically conductive workpiece, comprising:
    a platform configured to support the workpiece thereon;
    a dielectric detecting board movably set above the platform;
    an electrically conductive detecting unit supported on the detecting board in alignment with the hole placement of the workpiece;
    an electrical source configured for forming a circuit with the detecting unit and the workpiece;
    a processor electrically connecting with the circuit; and
    an indicator electrically connecting with the processor;
    wherein when the detecting board is moved to the workpiece, if the detecting unit enters the hole without touching with a wall of the workpiece bounding the hole, the circuit remains open, the processor receives a circuit open signal and controls the indicator to indicate that the hole is eligible; or if the detecting unit contacts the wall bounding the hole, the circuit closes, the processor receives a circuit closed signal and controls the indicator to indicate that the hole is ineligible;
    wherein the detecting unit comprises a detecting portion configured for inserting into the hole of the workpiece, a slot is defined in the detecting portion extending from a free end to a middle portion thereof.

2. The detecting apparatus as claimed in claim 1, wherein a circular hole is formed in communication with an end of the slot in the middle portion of the detecting portion.

3. The detecting apparatus as claimed in claim 1, further comprising an electric control box mounted under the platform, the electrical source and the processor being set in the electric control box, a plurality of controller buttons being set on the electric control box.

4. The detecting apparatus as claimed in claim 1, wherein the indicator comprises at least one of a display, an indicator light and an annunciator.

5. The detecting apparatus as claimed in claim 1, wherein a cylinder device is provided to drive the detecting board to move.

6. A detecting apparatus for checking accuracy of linearity/position of holes of a workpiece which forms an electrically conductive wall bounding each of the holes, comprising:
    a platform configured to position the workpiece thereon;
    a detecting board movably set above the platform;
    a plurality of electrically conductive detecting units secured to the detecting board and configured to enter into the holes of the workpiece respectively when the detecting board is moved toward the workpiece;
    a power source configured for forming a plurality of circuits with the detecting units and the corresponding walls of the workpiece;
    a processor electrically connecting with the circuits and configured to detect whether the detecting units touch with the corresponding walls of the workpiece and generate corresponding control signals; and
    an indicator for receiving the control signals of the processor to indicate whether the holes are eligible;
    wherein each of the detecting units comprises a detecting portion configured for being received in the hole, a slot is defined in the detecting portion of each of the detecting units to separate the detecting portion into two spaced sections to make the detecting portion radially deformable.

7. The detecting apparatus as claimed in claim 6, wherein the indicator comprises an indicator light, if all of the detecting units enter into the corresponding holes without touching with the corresponding walls of the workpiece, all of the circuits remain open, the processor controls the indicator light to shine which indicates that all of the holes are eligible.

8. The detecting apparatus as claimed in claim 7, wherein the indicator further comprises an alarm annunciator, if one of the detecting units enters into the corresponding hole touching with the corresponding wall of the workpiece, one of the circuits is closed, the processor controls the alarm annunciator to be activated which indicates that at least one of the holes is eligible.

9. The detecting apparatus as claimed in claim 7, wherein the indicator further comprises a display, if one of the detecting units enters into the corresponding hole touching with the corresponding wall of the workpiece, the one of the circuits is closed, the processor controls the display to display a location of an ineligible hole which corresponds to the one of the detecting units.

10. The detecting apparatus as claimed in claim 6, wherein a plurality of assembly holes is defined in the detecting board, each of the detecting units comprises an assembly portion, the detecting units are secured to the detecting board via the assembly portions being mounted in the assembly holes.

11. The detecting apparatus as claimed in claim 6, wherein a circular hole is formed in the detecting portion of each of the detecting units and in communication with an end of the slot of each of the detecting units.

12. The detecting apparatus as claimed in claim 11, wherein a generally bulb-shaped touching head is formed at a free end of the detecting portion of each of the detecting units.

* * * * *